US009038756B2

(12) United States Patent
Mazzini

(10) Patent No.: US 9,038,756 B2
(45) Date of Patent: May 26, 2015

(54) PROPULSION SYSTEM FOR A SELF-PROPELLED VEHICLE WITH MULTIPLE ELECTRIC DRIVE UNITS

(75) Inventor: Samuele Mazzini, Montone (IT)

(73) Assignee: S.M.R.E. S.p.A. (IT)

( * ) Notice: Subject to any disclaimer, the term of this patent is extended or adjusted under 35 U.S.C. 154(b) by 0 days.

(21) Appl. No.: 14/114,979

(22) PCT Filed: Mar. 28, 2012

(86) PCT No.: PCT/IT2012/000095
§ 371 (c)(1),
(2), (4) Date: Oct. 31, 2013

(87) PCT Pub. No.: WO2012/157008
PCT Pub. Date: Nov. 22, 2012

(65) Prior Publication Data
US 2014/0076102 A1    Mar. 20, 2014

(30) Foreign Application Priority Data
May 18, 2011 (IT) .............................. RN2011A0036

(51) Int. Cl.
*B60K 1/02* (2006.01)
(52) U.S. Cl.
CPC ............. *B60K 1/02* (2013.01); *Y10T 74/19056* (2015.01); *B60Y 2200/12* (2013.01)
(58) Field of Classification Search
CPC ..................................................... B60K 17/08
USPC ............ 180/65.1, 65.31, 65.6, 65.7, 292, 214
See application file for complete search history.

(56) References Cited

U.S. PATENT DOCUMENTS

| 3,533,484 | A | | 10/1970 | Wood, Jr. |
| 4,579,019 | A | * | 4/1986 | Gabriele ............................. 475/5 |
| 5,048,626 | A | * | 9/1991 | Strehler et al. ................ 180/19.2 |
| 5,501,292 | A | * | 3/1996 | Kawashima et al. ......... 180/220 |
| 6,089,341 | A | * | 7/2000 | Gingerich ..................... 180/65.1 |
| 6,698,313 | B2 | * | 3/2004 | Gaffney et al. ............. 74/665 N |
| 8,556,021 | B2 | * | 10/2013 | Nomura et al. ............... 180/292 |
| 2003/0132039 | A1 | * | 7/2003 | Gaffney et al. .............. 180/65.1 |
| 2011/0040434 | A1 | | 2/2011 | Kishibata |
| 2014/0076102 | A1 | * | 3/2014 | Mazzini ....................... 74/665 B |

FOREIGN PATENT DOCUMENTS

DE          19941474          3/2001

OTHER PUBLICATIONS

International Search Report and Written Opinion from counterpart app No. PCT/IT2012/000095.

* cited by examiner

*Primary Examiner* — Jeffrey J Restifo
(74) *Attorney, Agent, or Firm* — Timothy J. Klima; Shuttleworth & Ingersoll, PLC

(57) ABSTRACT

A propulsion system for a self-propelled vehicle comprises a motor body which is associated with a mechanical transmission conveying motion to the driving wheels of the vehicle, and which integrates and contains in a single body electric propulsion means, comprising at least several components of a brushless rotary motor; a clutch coupling located downstream of and mechanically connected to the electric propulsion means; and a gearbox with discontinuous gear ratios, having an input shaft connected to the clutch coupling and an output shaft coming out to the outside of the motor body and connecting to the mechanical transmission. The electric propulsion means comprise the components of at least two brushless motors, each equipped with a respective driving shaft provided with a pinion which is coupled by meshing with a predetermined ratio to a clutch coupling.

10 Claims, 2 Drawing Sheets

PROPULSION SYSTEM FOR A SELF-PROPELLED VEHICLE WITH MULTIPLE ELECTRIC DRIVE UNITS

This application is the National Phase of International Application PCT/IT2012/000095 filed Mar. 28, 2012 which designated the U.S.

This application claims priority to Italian Patent Application No. RN2011A000036 filed May 18, 2011, which application is incorporated by reference herein.

TECHNICAL FIELD

This invention relates to a propulsion system for self-propelled vehicle with multiple electric drive units.

BACKGROUND ART

In propulsion systems for self-propelled vehicles in which a mechanical transmission, which sends power to the driving wheels of the vehicle and receives at input the power supplied by an electric motor by means of a clutch coupling and a gearbox with a moderate number of gears, the continual search for construction solutions able to develop increasingly high propulsive powers, with drive units that at the same time are compact, clashes with implementation problems which are quite difficult to overcome.

In fact, it is known in general that in an electric drive unit, referable for example to the modern brushless motors type, motor performance is directly linked to the dimensions of the motor.

Consequently, to obtain an increase in the torque, the diameter of the electric motor can be increased, or the body of the motor can be lengthened; or both of those alternatives may be adopted simultaneously.

However, the practical application of such ideas is not entirely easy. In fact, considering a drive unit of a light vehicle such as a motorcycle, and, more particularly, considering a solution such as that described and illustrated in a document by the same Applicant, which integrates as one unit in a compact motor body with reduced dimensions an electric propulsion unit, a gearbox and a clutch coupling interposed between and directly connected to them, it can be seen how the freedom of construction quickly reaches limits which in practice cannot be exceeded, unless using special materials which are not commonly used for the construction of such drive units.

In fact, in the above-mentioned solution the driving shaft of the electric motor is directly connected to the clutch by means of a pair of gears. A primary gear is supported by the driving shaft. A secondary gear is in the form of a ring gear supported by a clutch housing and coupled with the primary gear. If in that configuration an attempt is made to increase the power that can be supplied by the motor in accordance with the construction approach of increasing the motor diameter, then it is automatically necessary to modify the centre-to-centre distance between the primary and secondary gears. However, an increase in the centre-to-centre distance involves increasing the primary gear tip speed. But since said speed cannot be increased indefinitely, it quickly becomes apparent that the maximum power that the electric motor can supply is subject to mechanical limits which cannot be surpassed.

Alternatively, adopting the construction approach which in contrast involves increasing the size of the motor in the axial direction of the driving shaft, the motor obtained is more powerful, but with greater axial extension, which—if used for example to propel a motorcycle—is not without limits since the increased axial extension means that there has to be a reduction in the maximum lateral angle of inclination that the motorcycle can adopt when negotiating a bend without the motor interfering with the ground.

DISCLOSURE OF THE INVENTION

The aim of this invention is to overcome the above mentioned disadvantages with an embodiment which comprises coupling to a single clutch ring gear two or more brushless electric motors, positioned around the periphery of the ring gear.

A first advantage of that invention is the fact that a significant increase in power is achieved practically without any appreciable increase in the width of the motor, that is to say, of the motor body housing the electric motors or their component parts. Therefore, there is no limitation on the vehicle lateral angle of inclination, that is to say, speed when negotiating a bend, compared with lower powered known vehicles.

A second advantage of the invention is the fact that, having two or more o coupled with the same clutch ring gear, it is possible to increase the autonomy of the vehicle, since the performance of the motors can be modulated individually, so that it even possible to temporarily stop one (or several) of them operating so as to obtain economical performance.

A third advantage of the invention is the fact that, having two or more motors coupled with the same clutch ring gear, it is possible to use software to manage the temperature of the individual motors, sending greater quantities of current to the motor with the lowest temperature, then inverting the function when the condition between the various motors changes.

Having an overrunning (or freewheel) coupling between the friction clutch coupling and the driving shaft of the motor or motors means that it is possible to also have the further advantage of preventing the slowest motor from braking the fastest motor and/or being able to use different gear ratios to increase performance or efficiency, or to increase the acceleration or top speed, of the vehicle.

Adopting two separate operating and control systems for each motor gives the further advantage of being able to have a safety backup unit in the event of a fault in one of the motors or one of the electronic control units.

BRIEF DESCRIPTION OF THE DRAWINGS

Further features and advantages of this invention are more apparent in the detailed description which follows, with reference to the accompanying drawings whiff illustrate preferred, non-limiting embodiments of the invention, in which.

DETAILED DESCRIPTION OF THE PREFERRED EMBODIMENTS OF THE INVENTION

Figure 1:
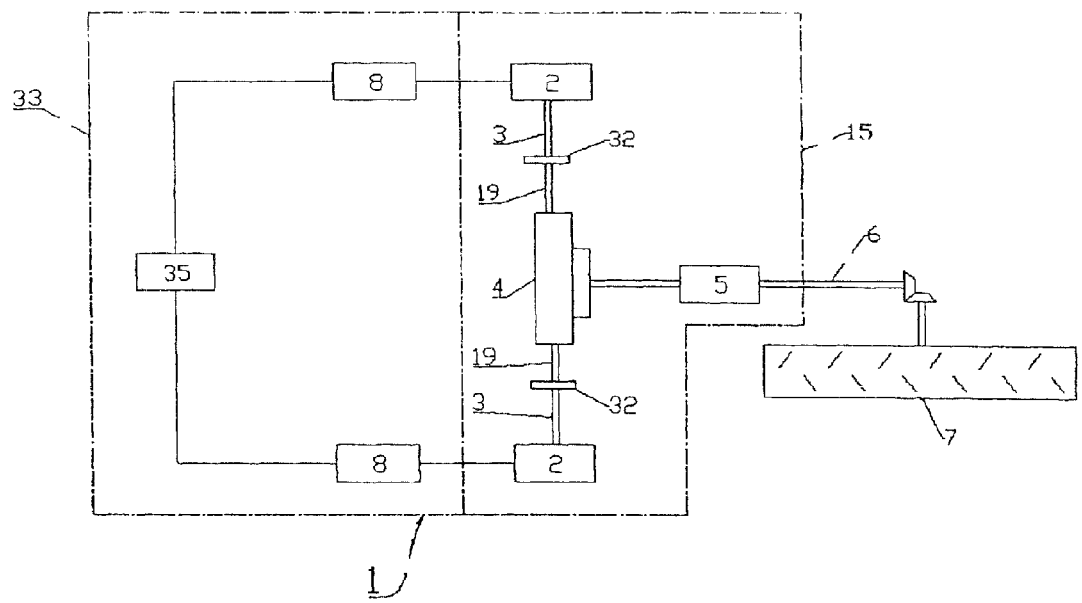
FIG. 1 is a schematic diagram of a propulsion system according to the invention.
Figure 2:
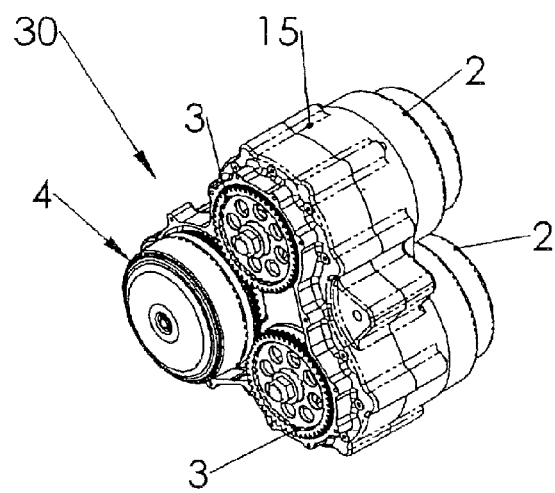
FIGS. 2 and 3 are perspective views of the system as a whole, seen from two opposite viewpoints.
Figure 3:
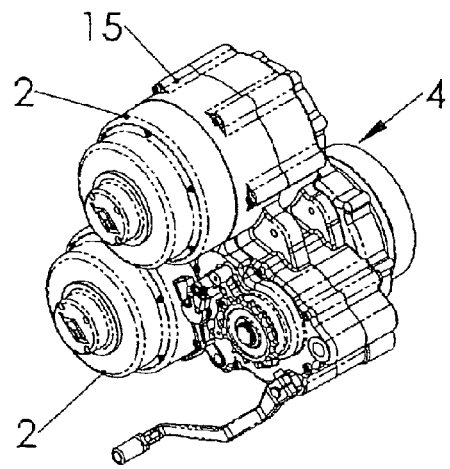
Figure 4:
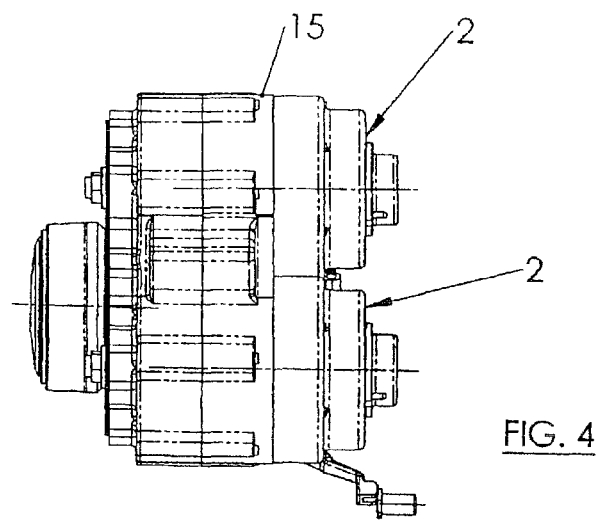
FIG. 4 is a side views of the system of FIGS. 2 and 3.
Figure 5:
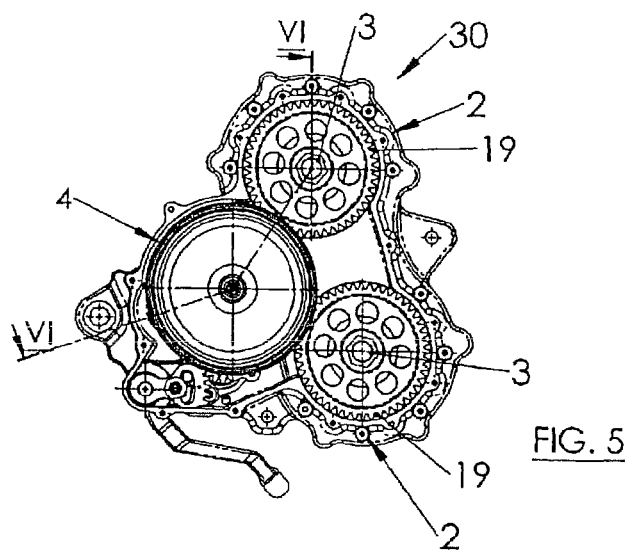
FIG. 5 is a front assembly view of the system.

With reference to the accompanying drawings, FIG. 1 schematically illustrates in its entirety a propulsion system for a self-propelled vehicle which basically comprises a drive unit 33, 15 which—powered by electric batteries (not illustrated)—generates mechanical power at output; and a mechanical transmission 6 which receives at input the power generated by the drive unit 33, 15 and conveys it at output to one or more driving wheels 7 for generating the advancing motion of the vehicle relative to the ground.

Figure 6:
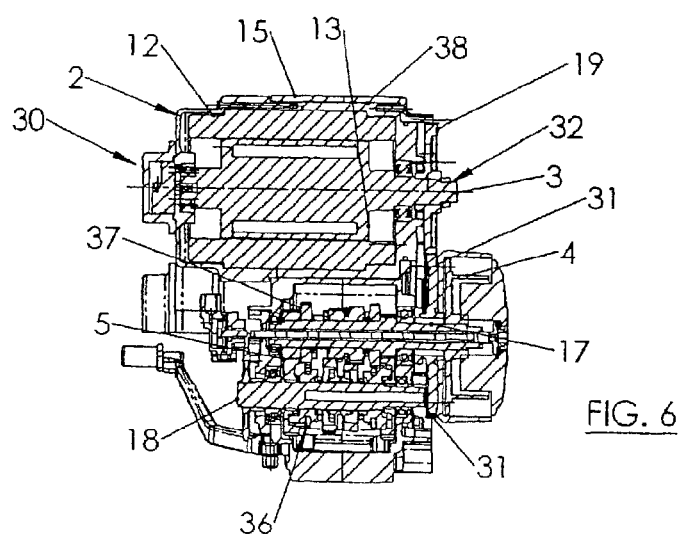
FIG. 6 is a cross-section of the system along the line VI-VI of FIG. 5.

The drive unit 33, 15—particularly advantageous for use for example on a motorcycle, without thereby limiting the scope of the invention—comprises in particular a motor body 15 which—positioned upstream of the mechanical transmission 6 [FIG. 1]—integrates and contains in a single body [FIGS. 2 to 5]:

electric propulsion means 30;
a friction clutch coupling 4 operatively positioned downstream of and mechanically connected to the electric propulsion means 30; and
a gearbox 5 with discontinuous gear ratios [FIG. 6], having an input shaft 17 connected to the clutch coupling 4 and an output shaft 18 coming out to the outside of the motor body 15 and connecting to the mechanical transmission 6.

More particularly, the electric propulsion means 30 comprise two or more brushless motors 2 equipped with a casing 38 housed in the motor body 15 and in turn containing—as components—a stator 12 and a rotor 13. Each motor 2 comprises a respective driving shaft 3 provided with a pinion 19 which is coupled by meshing with a predetermined ratio to a single, shared ring gear 31, supported by the clutch coupling 4. Therefore, the vehicle is propelled with a total gear ratio between the driving shaft 3 and the gearbox output shaft 18 which is the product of two ratios: a fixed primary ratio, determined by the meshing ratio of the pinion 19 and the ring gear 3; and a variable secondary ratio, determined by the meshing selection adopted for the gears 36, 37 of the gearbox 5 while driving the vehicle.

Preferably, the electric propulsion means 30 comprise overrunning or freewheel couplings 32 operatively positioned between each driving shaft 3 and the respective pinion 19. Said freewheel couplings 32 are shown in symbol form in FIG. 1. In practice, when making the drive unit, they can be associated directly with a bearing interposed between the pinion 19 and the driving shaft 3.

In that way, the permanent meshing of the pinions 19 with the ring gear 31 being equal, if the individual motors 2 were to operate at different operating speeds, the slowest motor would be prevented from having a braking action on the faster motor or motors, as explained in more detail below.

The brushless motors 2 shown in the drawings are limited—by way of example only—to two, which are identical to each other. It shall be understood that said number is provided by way of example only, without limiting the scope of the invention, since there could be as many motors 2 as can fit in the geometric space around the clutch coupling 4, It is also possible to have combinations of different brushless motors 2, or the same brushless motors 2 but configured with different primary ratios, so as to obtain electric drive units 33, 15 able to provide different performance according to the various operating needs.

To allow individual control of each motor 2, the system 1 preferably comprises, although without limiting the scope of the invention, independent actuators 8 for each motor 2,controlled by control means symbolically illustrated by the block 35

Said control means 35 may activate selective operation of the brushless motors 2 automatically—managed by a more general electronic control unit equipped with dedicated hardware and software—or may be controlled by deliberate commands issued at will by the driver of the self-propelled vehicle which uses the drive unit 33; 15.

Among the many possibilities for automatic control which can be performed by the control means 35—and which can be managed by the dedicated control software—is the possibility of managing the actuators 8 of the brushless motors 2 depending on a predetermined control parameter, for example the current operating temperature of the motor 2.

In practice it is possible to program the control means 35 in such a way that a predetermined motor 2 which has reached an excessive temperature threshold is switched off for supplied with reduced current) to allow it to cool and begin operating again at full capacity after a time suitable for eliminating the heat.

The invention may have many alternative embodiments, all covered by the same inventive concept. These may even include construction solutions comprising motors 2 without their own casing 38, whose casing is formed only by the motor body 15—for example made of aluminum alloy—shaped in such a way that it has cavities in which it is possible to directly insert the stator 12 and the rotor 13 of the brushless motor 2.

The invention fulfils the preset aims, having many advantages, as already partly indicated.

These include the advantage of obtaining a significant it improvement in performance.

In fact, the use of two or more motors 2 meshing on the me ring gear 31 of the clutch coupling 4, allows multiplication of the torque transferred, while keeping the overall dimensions of the drive unit 33, 15 low. In this way, the motors 2 used do not have to operate at top capacity to provide good performance as is the case when using a single motor 2, given the ease with which very high performance can be achieved and considering the increase in overall efficiency that can be derived from the greater output of a small sized motor compared with a large motor.

In other words, with the system 1 according to the invention the t are used within their nominal values for greatest efficiency.

That advantage is very clear with reference to the appended table in which—by way of example—a comparison is made between the performance of a drive unit 33, 15 equipped with a single motor 2, having a maximum nominal torque of 25 Nm, and with two motors 2 which have an identical electrical configuration, but with a maximum nominal torque of 12.5 Nm.

|  | MAX. torque | kW | RPM | Max. A |
| --- | --- | --- | --- | --- |
|  | 25 Nm | 75 | 31.42 | 4000 | 350 A |
|  | 12.5 Nm | 38 | 16 | 4000 | 160 A |
|  | 12.5 Nm | 38 | 16 | 4000 | 160 A |
| Sum of the two motors | 76 | 32 | 4000 | 320 A |

As can be seen from the table, using two motors 2 gives a big advantage in terms of use of maximum current, despite the maximum power and maximum torque available being practically identical in the solutions using one and two motors. In this case it is easy to understand that without overhauling the dimensions of the entire unit, using two motors 2 for example rated 16.5 Nm—that is to say motors 2 just a little longer than those indicated in the table—it is possible to increase the performance and achieve power values of around 46 kW: something that is absolutely impossible with a single motor 2 of the conventional type.

Another considerable advantage of invention is an increase in the autonomy of the self-propelled vehicle.

In fact, as may be inferred from the table above, the performance being equal, there is a noticeable reduction in current used. For an electrically propelled vehicle, that is a very important aspect. Even more important is the fact that, being able to control the current sent to the motor or motors, if one reduces the current the performance of the vehicle will be reduced in proportion to the programmed reduction, but it will also have reduced consumption.

Yet another advantage is the possibility of managing the operating temperature of the motors.

In fact, as known, one f the main problems of current electric vehicles is overheating of the motors due to the heavy use they are subjected to. In most vehicles the motors are positioned in locations where natural heat dissipation is difficult, therefore, to cool them complex and expensive air or liquid forced cooling systems are developed. Moreover, with the advent of new technologies applied to batteries, increasing autonomy for use is achieved and therefore longer continuous use times, meaning more motor overheating.

In the multiple drive unit system according to the invention, each motor 2 has inside it an analogue thermal probe which transfers all data to a control printed circuit board. The current supplied to the individual motor 2 can therefore be modulated—by means of software—depending on the temperature of the individual motor. Since the current supplied to the motor is directly proportional to its heating, in this way it is possible to modulate the current of the individual motor, reducing the amount supplied to the hottest motor and increasing the amount supplied to the coolest motor. Once the temperature has gone down, if necessary the software will invert the values, keeping them balanced between one motor and the other all of this without the driver noticing and without him having to intervene in any way.

The use of a multiple drive unit system also allows different motor configurations intended to cater for different requirements, such as high performance or operating autonomy.

In fact, since it is possible to use different gear ratios between the pinion of each motor and the clutch coupling ring gear, it is possible to significantly increase the speed of the gearbox output shaft and to have the electric drive unit reach speeds of rotation similar to those of conventional internal combustion engines. To understand the importance of such aspects, it should be noticed that a constant problem for the electric drive unit is that of the correct ratio of speed to torque. If there is an excessive increase in the speed (motor number of revolutions in the unit of time rpm), then torque (Nm) is lost, since in an electric motor torque is usually at its maximum at zero rpm and is reduced as the rpm increases. With the freewheel system on the pinions of the individual motors, each motor can be connected to the clutch ring gear with a different reduction ratio (primary reduction ratio). That allows an enormous flexibility and advantage for the drive unit 33; 15, since it is possible to use first a higher torque transferred by the motor 2 connected with the greater reduction ratio, and then, having reached the maximum rpm, to use the greatest number of rpm transferred by the other motor or motors, having smaller reduction ratios.

In practice, if motors which all have the same top speed are used, and if said motors are equipped with different pinions, the consequent different reduction ratios may transfer to the gearbox 5 a greater number of total revolutions. In fact, assuming for example that there are two motors 2 connected to the clutch ring gear 31 and both revolving for example at 4000 rpm; and also assuming, that a first motor 2 is connected with a ¼ ratio (between its pinion 19 and the ring gear 31 of the clutch coupling 4) while the other motor 2 is connected with a ½ ratio, then at start-up the first motor 2 will transfer a greater torque to the clutch ring gear 31, thanks to its greater mechanical reduction or step-down, but will be able to contribute to motion until its maximum revolutions are reached equal to 4000 rpm, corresponding to 1000 rpm by the clutch ring gear 31, while the second motor 2 can continue accelerating, since when the ring gear 31 is revolving at 1000 rpm this motor 2 is still only revolving at 2000 rpm, therefore at 50% of its top speed of 4000 rpm.

Therefore, this second motor 2 will continue vehicle acceleration until the ring gear 31 reaches 2000 rpm. In such condition the overrunning or freewheel coupling 32 installed on the first motor 2 prevents the first motor 2 from being made to overrun, or it prevents the first motor 2 from having a braking action on the second motor 2. Therefore, thanks to the freewheel coupling, the pinion 19 of the first motor 2 will rotate faster than its own shaft 3 which will continue to rotate at the maximum revolving speed of that motor 2.

In conclusion, by suitably selecting the number of brushless motors 2 to be associated with the same ring gear 31 and suitably selecting the primary gear ratios it is possible to build an electric drive unit whose mechanical propulsion features are suitable for the application in question.

Another advantage is the fact that the presence of two separate operating and control units 8, one for each individual motor 2, allows an entire safety backup unit to be present, which can advantageously be used in the event of a fault in one of the motors 2 or one of the operating and control units 8 which control them.

The invention described above is susceptible of industrial application and may be modified and adapted in several ways without thereby departing from the scope of the inventive concept. Moreover, all details of the invention may be substituted by technically equivalent elements.

The invention claimed is:

1. A propulsion system for a self-propelled vehicle comprising:
   a single body electric propulsion unit;
   a clutch coupling located downstream of and mechanically connected to the electric propulsion unit; and
   a gearbox with discontinuous gear ratios, having an input shaft connected to the clutch coupling and an output shaft coming out to an outside of the motor body;
   a single ring gear supported by the clutch coupling;
   a motor body combining together the electric propulsion unit, the clutch coupling, the ring gear and the gearbox;
   a mechanical drive connecting the output shaft to driving wheels of the vehicle;
   the electric propulsion unit comprising components of at least two brushless motors, each of the at least two brushless motors including a respective driving shaft including a pinion meshingly coupled to the ring gear in a respective predetermined ratio such that the at least two brushless motors all drive the single ring gear.

2. The system according to claim 1, wherein the electric propulsion unit further comprises at least one freewheel coupling operatively positioned between one of the driving shafts and a respective one of the pinions.

3. The system according to claim 1, wherein the at least two brushless motors are identical.

4. The system according to claim 1, wherein the at least two brushless motors are different from each other.

5. The system according to claim 1, wherein the at least two brushless motors are selectively operable.

6. The system according to claim 1, and further comprising a controller programmed to selectively activate actuators of the at least two brushless motors depending on at least one predetermined control parameter.

7. The system according to claim 6, wherein the controller is programmed to selectively activate the actuators of each of the at least two brushless motors depending on an operating temperature of at least one of the at least two brushless motors.

8. The system according to claim 1, wherein the at least two brushless motors are selectively operable by commands issued by the vehicle driver.

9. The system according to claim 1, wherein the motor body is an integral part of a housing for containing the components of the at least two brushless motors.

10. The system according to claim 1, wherein the self-propelled vehicle is a motorcycle.

* * * * *